April 30, 1957 J. H. SCHACHTE 2,790,619
AUTOMATIC WEIGHING LOADER
Filed June 24, 1952 4 Sheets-Sheet 4

INVENTOR
JOHN H. SCHACHTE

BY Cushman, Darby & Cushman
ATTORNEY

United States Patent Office 2,790,619
Patented Apr. 30, 1957

2,790,619

AUTOMATIC WEIGHING LOADER

John H. Schachte, Charleston, S. C.

Application June 24, 1952, Serial No. 295,269

5 Claims. (Cl. 249—58)

This invention relates to a weighing and loading machine and more particularly to a sacking scale wherein an open bottom hopper constitutes the load holder of a weighing scale and is adapted to have the mouth of a bag detachably secured thereto for suspension therefrom with the thus arranged hopper disposed beneath the valve-controlled gravity-discharge spout of a storage bin.

Loading and weighing machines of this nature are well known and customarily employed for the sacking of fertilizers, grain, and like materials with an accurate material weight in each bag. Known machines of this type, however, usually are completely manually operated, i. e. the bag clamps are operated by hand to clamp a bag in position on the neck of the hopper and the filling valve controlling the storage bin spout is then manually opened to allow material to flow, by gravity, into the hopper in order to fill the bag. The weight of the material in the bag is carefully watched upon the scale indicator until the weight approaches a predetermined amount intended to be contained within the bag, e. g. 100 lbs. As the flow from the spout fills the bag to nearly this predetermined weight, the operator of the machine slowly closes the filling valve and then quickly shuts such valve when the weight within the bag reaches the predetermined amount.

Obviously in known machines of the above described type, the operator must be very attentive in order to fill each bag with the same weight of material. Further, a great deal of time is consumed by the operator of the machine in manipulating the filling valve to achieve the desired loading accuracy, in releasing the bag clamps to detach a loaded bag from the hopper, in placing an empty bag in proper position on the hopper, and in resetting the bag clamps to suspend the bag in filling position on the hopper.

Accordingly, it is an object of this invention to provide an improved weighing and loading machine of the type under consideration having means for automatically closing the filling valve and simultaneously releasing the bag clamps when the weight of the material within the bag reaches a predetermined amount.

It is another object of this invention to provide a sacking scale means for enabling an operator by a simple manual movement to both set the bag clamps after the bag has been placed in loading position on the neck of the scale-supported hopper and simultaneously to open the filling valve of the discharge spout.

It is another object of this invention to provide a machine of the type described with means responsive to the weight of the material within the bag to partially close the filling valve as the weight of the material approaches a predetermined amount and to completely close such valve when the weight in the bag reaches the predetermined amount, thus achieving accurate and uniform loading of each bag.

It is still another object of this invention to provide an improved automatic weighing and loading machine of the type described which achieves both speed and accuracy in the loading operation.

It is a further object of this invention to provide an improved machine which will achieve the above objects with both economy of manufacture and ease of operation.

Other objects and advantages of this invention will become apparent from the following description and accompanying drawings, in which.

Figure 1:
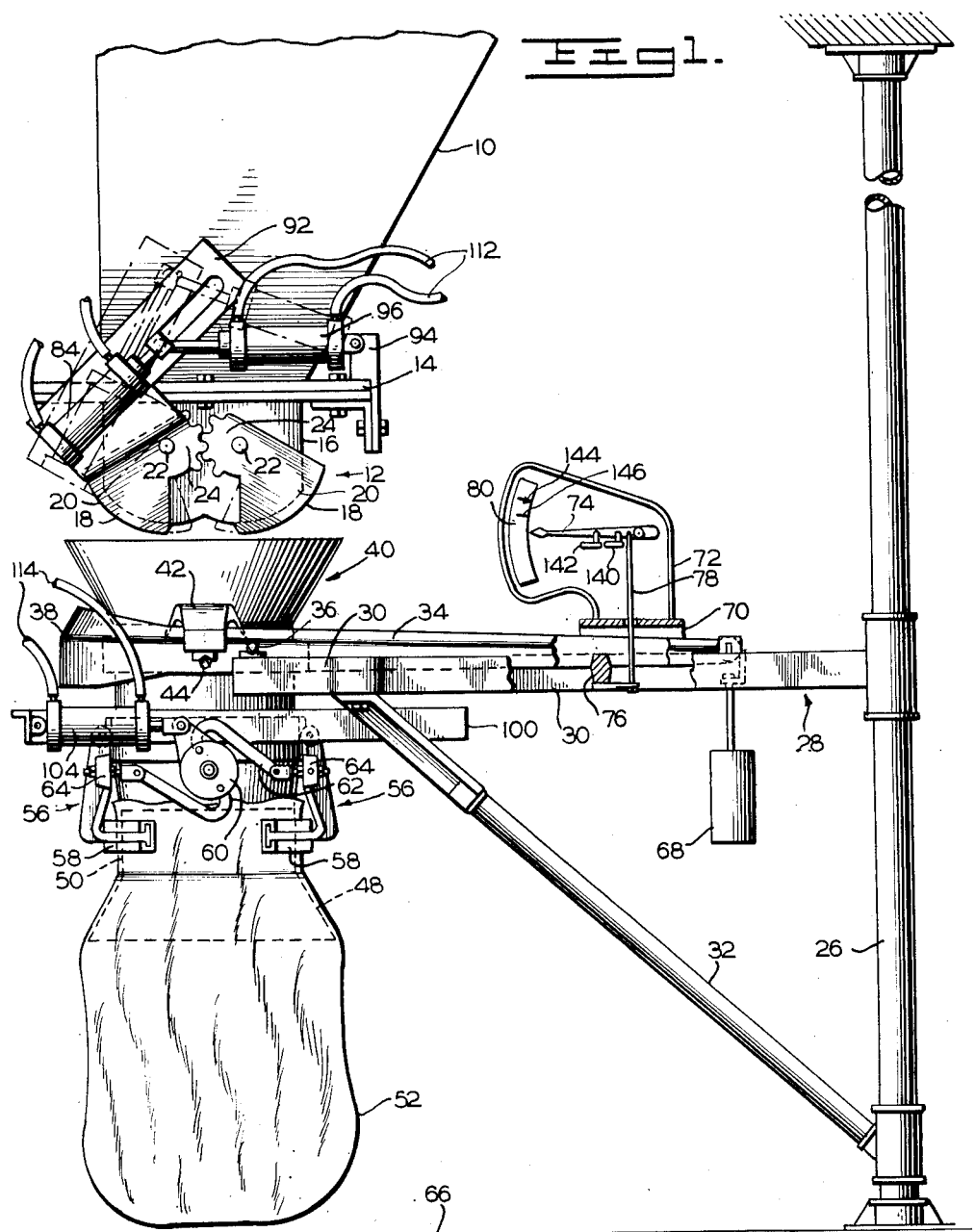
Figure 1 is an elevational view of an automatic weighing and loading machine embodying this invention and illustrating a bag clamped to the neck of the loading hopper and the filling valve in open position to allow material to flow into the hopper in order to load the bag. Portions are cut away to illustrate details more clearly.

Referring now to the drawings, there is shown in Figure 1 a machine embodying this invention. The gravity-discharge spout 10 of a storage bin (not shown) has a conventional filling valve 12 detachably secured thereto as by a bolted flange type of connection, indicated at 14. The filling valve 12 provides a tubular extension 16 for the spout 10 with the lower end of such extension shaped to be covered and uncovered by two valve members or plates 18. The valve members 18 have side flanges 20 which are mounted on pivot pins 22 on opposite sides of the spout 10 for pivotal movement about transverse spaced parallel axes. The thus-mounted two valve members 18 are interconnected by intermeshing segmental gear portions 24 on their side flanges 20, so that movement of one valve member results in corresponding movement of the other member.

Mounted on a supporting post 26, to one side of the discharge spout 10, is a horizontal weighing scale frame 28, substantially U-shaped in plan view and with its outwardly extending arms 30 supported by braces 32 extending from the outer ends thereof to the bottom of the post. The beam 34 of a weighing scale is supported by knife-edge pivots 36 which rest on the frame arms 30. The beam 34 is of substantially Y-shaped construction in plan view with the outer ends of such Y integrally connected by an arcuate portion 38. A filling hopper 40 is cradled in the beam 34 by lateral arms 42 on the hopper, which extend over the beam and rest on knife-edge pivots 44 on outer sides of the beam outwardly of the beam pivots 36. By means of this construction, it will be seen that the filling hopper 40 will be maintained in vertical position upon rocking movements of the scale beam 34.

Figure 2:
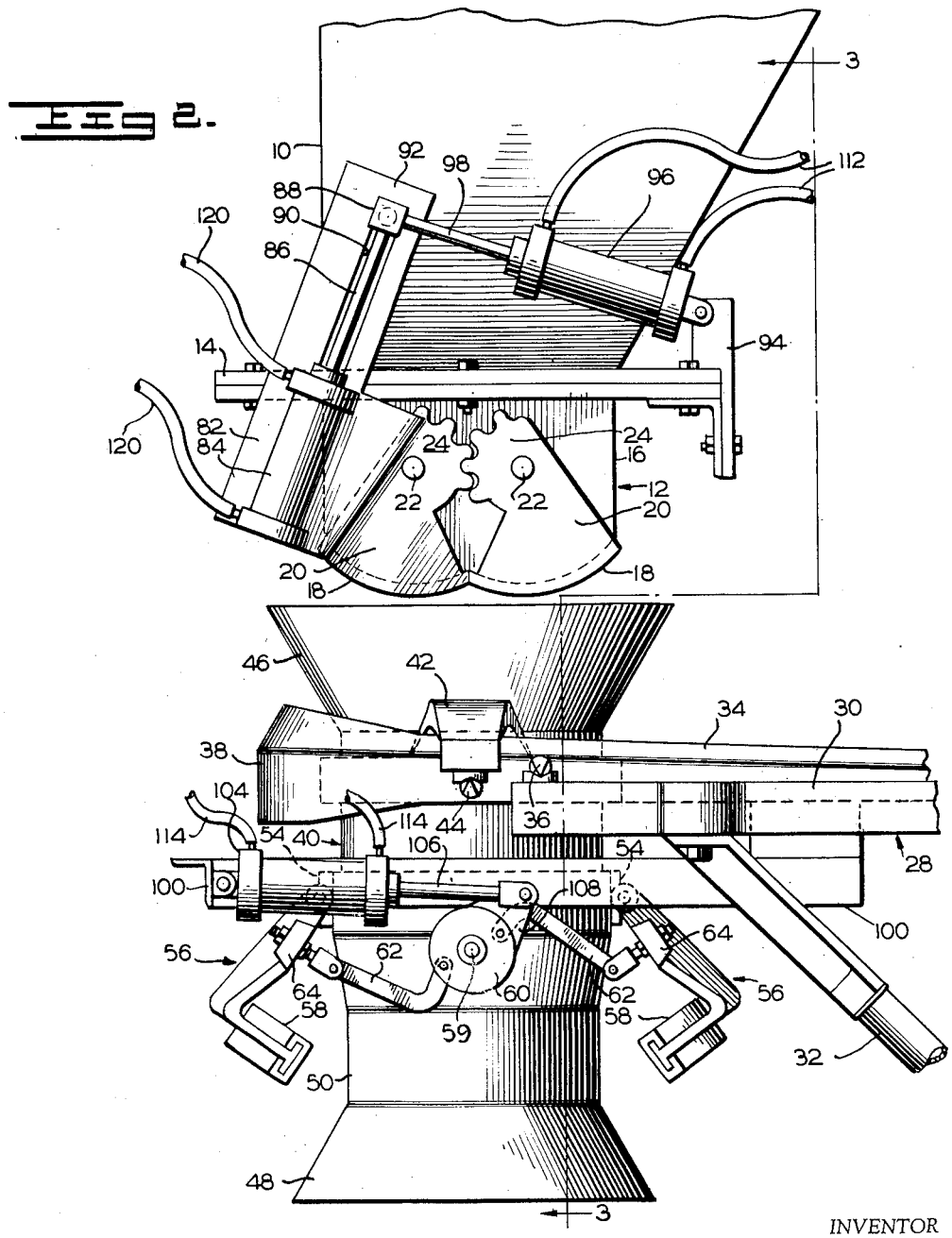
Figure 2 is an enlarged fragmentary view of a portion of the machine illustrated in Figure 1 and showing the filling valve closed and the bag clamps released for the positioning of a bag on the neck of the loading hopper.

The upper open end 46 of the filling hopper 40 is substantially funnel-shaped, as shown, and disposed beneath the valve 12, while the lower open end 48 of such hopper flares outwardly from a lower necked portion 50 for the reception of the mouth of a bag 52 thereover. Pivotally mounted on radial lugs 54 (Figure 2) on opposite sides of the hopper 40 are bag clamps 56, each provided with an arcuate bag-engaging jaw 58, preferably covered with rubber or the like, for firmly clamping the mouth of a bag in filling position on the neck portion 50 of the hopper, as best shown in Figure 1. Mounted on the opposite ends of a shaft 59 extending diametrically through the hopper 40 and parallel to the pivotal axes of the clamps 56 are toggle members 60. Each toggle member 60 is adjustably connected, by links 62, to the ends of transverse arms 64 on the clamps 56, so that rotation of the shaft 59 serves to operate the toggle mechanism to release the clamps, as best shown in Figure 2, or to set the clamps, as best shown in Figure 1, to clamp a bag in filling position on the neck 50 of the hopper 40 with the bottom of the bag a short distance above the floor 66.

On the other end of the scale beam 34 is an adjustment weight 68 (Figure 1) to balance the beam upon the filling of a bag with a predetermined weight of material. Mounted on a bridge 70 spanning the arms 30 of the scale frame 28 adjacent the weight end of the scale beam 34 is a dial housing 72 having an indicator arm 74 mounted therewithin for pivotal movement about a horizontal axis. The arm 74 is connected to a transverse beam member 76 by a rod 78, whereby movements of the beam are transmitted to the arm 74 to indicate upon the dial 80 whether the weight of material within a bag 52 is over or under a predetermined weight for which the scale is adjusted. As best illustrated in Figure 1, the weight of mateiral flowing into the bag 52 from the filling spout 10 gradually swings the indicator arm 74 clockwise. Since detailed refinements of the scale constitute no part of this invention, they are not disclosed herein.

Figure 3:
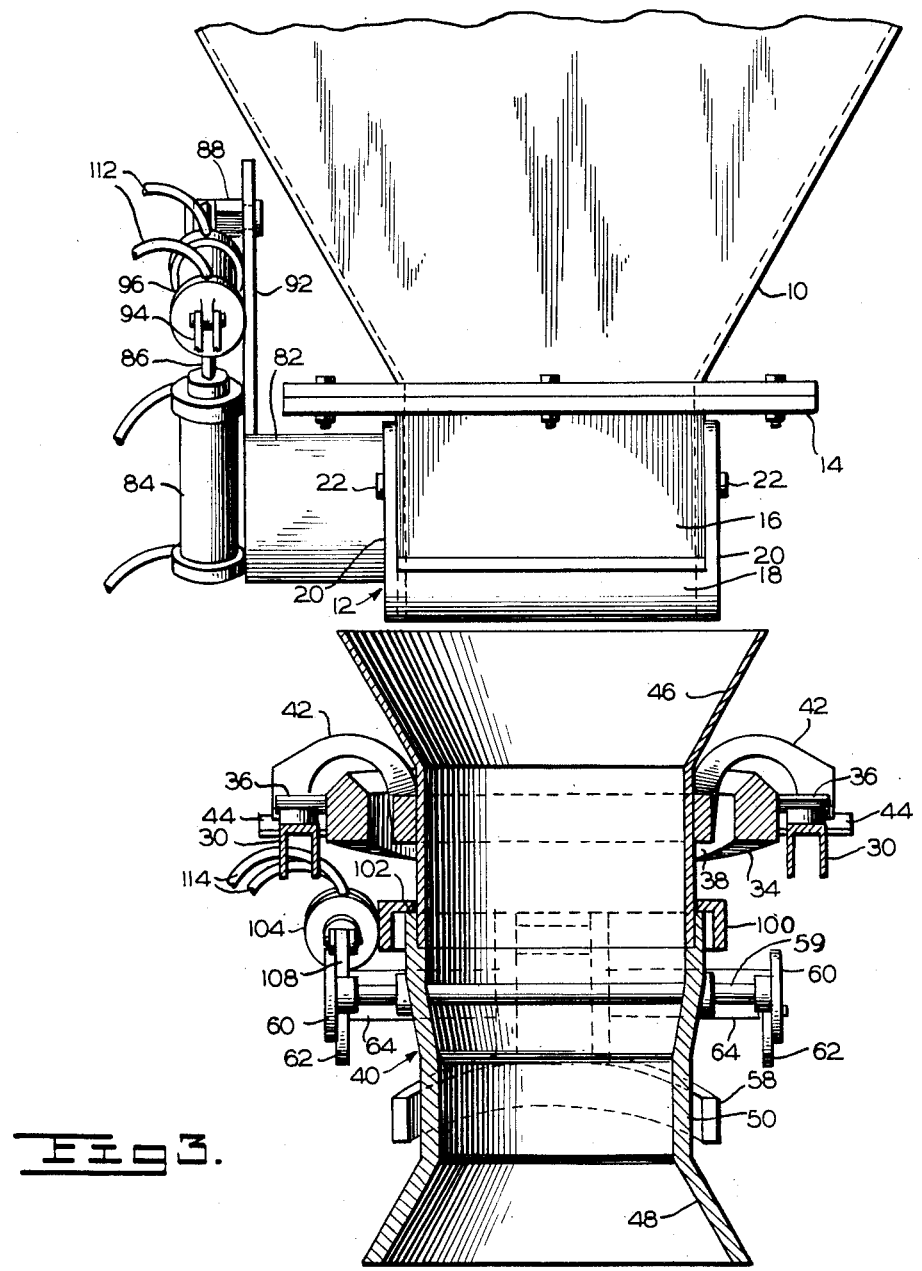
Figure 3 is a sectional view on the line 3—3 of Figure 2.

The improvement embodying this invention comprises the addition of fluid motors for operating the filling valve 12 ad the bag clamps 56. As shown best in Figures 1, 2, and 3, the flange 20 of one of the valve members 18 has a bracket 82 secured thereto and a power cylinder 84, provided with a projecting piston rod 86, is mounted on the bracket. The outer end of the piston rod 86 has a slide 88 fixed thereto, which is engaged within a slideway formed in a plate-like extension 92 of the bracket 82. Pivotally mounted on another bracket 94 secured to the bolted flange connection 14 between the valve 12 and the bin spout 10 is another power cylinder 96 having a piston rod 98 extending therefrom and pivotally connected to the slide 88. As will best be seen from an inspection of Figure 2, when the power cylinders 84 and 96 are operated to extend their piston rods 86 and 98, the valve members 18 will be rotated to close the valve 12. As will be seen from the solid line showing in Figure 1, when the power cylinders 84 and 96 are operated to retract their piston rods, the valve 12 will be fully open. If, however, as illustrated by the dotted lines in Figure 1, the power cylinder 84 is operated to extend its piston rod 86 while the piston rod 98 of power cylinder 96 remains retracted, the valve 12 will be partially closed.

Pivotally mounted on a rectangular frame 100 secured to and resting on a shoulder 102 formed on an intermediate portion of the filling hopper 40 (Figure 3) is another power cylinder 104 having the end of its projecting piston rod 106 pivotally connected to a radial lug 108 on the toggle member 60, so that the toggle mechanism may be operated to set or to release the bag clamps 56 by operation of the power cylinder 104.

Figure 4:
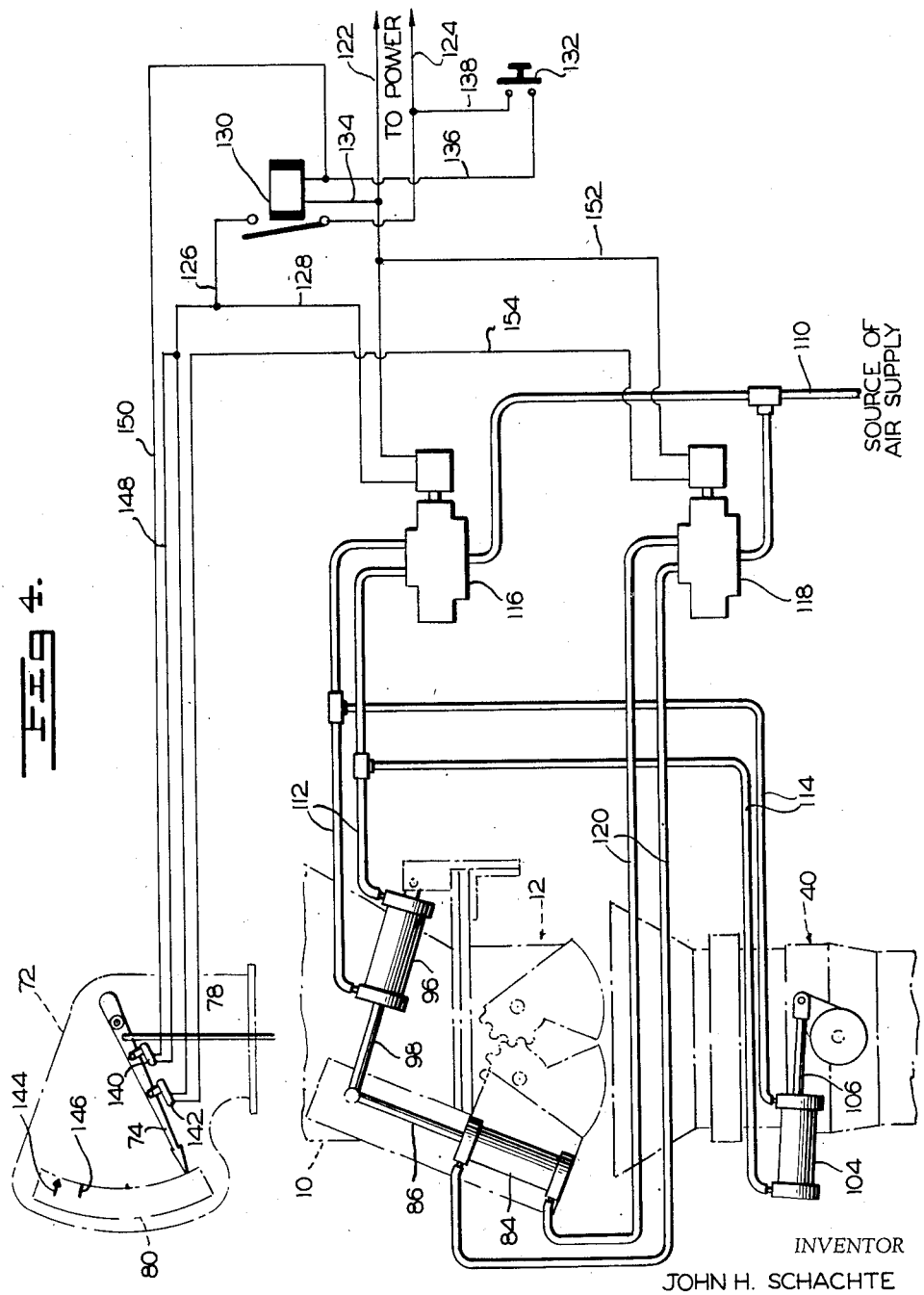
Figure 4 is a schematic view of the electrical and pressure fluid controls of the machine illustrated in Figure 1.

Referring now to Figure 4 of the drawings, it will be seen that power fluid for operating the cylinders 84, 96, and 104 may be supplied through a conduit 110 from any appropriate source of fluid under pressure, such as compressed air. Operating fluid is supplied to and exhausted from the opposite ends of the power cylinders 96 and 104 by flexible conduits 112 and 114 leading from a solenoid-operated conventional four-way control valve 116 which is connected to the conduit 110. When the solenoid valve 116 is energized, the power cylinders 96 and 104 are operated simultaneously to retract their piston rods 98 and 106, as shown in Figure 1, so that the filling valve 12 is completely open and the bag clamps 56 are set. The admission and exhaust of pressure fluid to the power cylinder 84 is controlled by another solenoid-operated valve 118 receiving fluid from the conduit 110 and connected to the cylinder 84 by flexible conduits 120. The valve 118, when energized, operates to retract the piston rod 86. Both solenoid valves 116 and 118 are spring biased for operation in the opposite direction upon deenergization thereof.

Electrical power for energizing the solenoid valves 116 and 118 may be obtained from any appropriate source and is supplied through the main conductors 122 and 124. Connected in series across the main conductors 122 and 124, by conductors 126 and 128, are the normally-open contacts of a relay 130 and the energizing coil of the solenoid valve 116. The energizing coil of the relay 130 and a normally-open push button switch 132 are connected in series across the two main conductors 122 and 124 by conductors 134, 136, and 138.

Adjustably mounted on the indicator arm 74 of the scale are two mercury switches 140 and 142, which are adjusted to be closed when the indicator arm tilts to its lowermost position, as shown in Figure 4. The switch 140 is so adjusted on the arm 74 that it opens at the exact point when the indicator arm pivots upwardly to a point 144 on the dial 80 corresponding to a predetermined weight of material contained within a bag clamped to the filling hopper 40. Such predetermined weight may, for example, be 100 lbs., with which weight a series of bags are adapted to be filled. The other mercury switch 142 is so adjusted that it opens when the indicator arm 74 pivots upwardly to a point 146 somewhat in advance of the point 144. It thus will be seen that the switches 140 and 142 are opened in succession as the indicator arm 74 approaches and arrives at the predetermined weight indication.

The switch 140 is shunted across the conductors 128 and 136 by the conductors 148 and 150, while the energizing coil of the valve 118 and the switch 142 are series connected in parallel with the energizing coil of the valve 116 by conductors 152, 154, and 128.

In operation of the machine the electrical circuits will be in the position shown in Figure 4. With the switches 140 and 142 closed but with the contacts of the relay 130 open, no current flows to the solenoid valves 116 and 118, so that the piston rods of all of the power cylinders 84, 96, and 104 are extended to thus maintain the bag clamps 56 open and the filling valve 12 closed. The mouth of an empty bag is then slipped over the lower end 48 of the filling hopper 40 by an operator and held in such a position while the operator depresses the push button switch 132. Closing of this switch 132 energizes the relay 130, via conductors 134, 136, and 138, to close its contacts and thus energize the solenoid valve 116, via the conductors 126 and 128 and also the solenoid valve 118, via the conductors 126 and 128, switch 142, and conductors 154 and 152. Energization of the solenoid valves operates all the power cylinders to retract their piston rods, thus fully opening the filling valve and setting the bag clamps to retain the bag in suspended and supported position on the hopper, as shown in Figure 1. It will be noted that the relay 130 is self-energizing via conductors 134, 136, 150, 148, 128, and 126, when the mercury switch 140 and the relay contacts are closed. Therefore, even though the operator releases the push button switch 132, the filling valve 12 will be maintained open and the bag clamps 56 set.

Thereupon material flows from the bin spout 10 through the valve 12 into the hopper 40 and thence into the bag 52 supported thereon. As the bag becomes filled, the weight thereof will increase to thereby rock the scale beam 34 counterclockwise about the pivots 36, thereby pivoting the indicator arm 74 in an upward direction. When the indicator arm reaches the position or point 146, the mercury switch 142 will open, thus deenergizing the solenoid valve 118 and thereby effecting extension of the piston rod 86 of the power cylinder 84 to the position shown in dotted lines in Figure 1, to thereby partially close the filling valve 12, as also shown in dotted lines, and slow the flow of material from the spout 10. Thereupon filling of the bag 52 will continue at a decreased rate so that when the indicator arm 74 reaches the position 144, the corresponding opening of the mercury switch 140 will deenergize the relay 130. Deenergization of the relay 130 immediately opens its contacts to thereby deenergize the solenoid valve 116 and causes the power cylinder 96 to extend its piston rod 98 and rapidly close the filling valve 12 to prevent further discharge of material into the bag. This slowing before rapid cut-off of the flow of material from the spout 10 results in extreme accuracy in the weight of material loaded into the bag.

Deenergization of the solenoid valve 116 also operates the power cylinder 104 to extend its piston rod 106 and release the bag clamps 56 so that the loaded bag falls a short distance to the floor 66 where it may be removed and its mouth tied by an operator. Thereafter, the aforementioned loading cycle is repeated upon an operator's positioning an empty bag on the hopper and again closing the push button switch 132.

It thus will be seen that the objects of this invention have been fully and effectively accomplished. It will be realized, however, that the embodiment described and illustrated for the purpose of disclosing the principles of the invention is susceptible to various changes without departing from such principles. Therefore, this invention embraces all modifications encompassed by the spirit and scope of the following claims.

I claim:

1. An automatic weighing and loading machine comprising: a pivotal valve adapted to be attached to the open end of a gravity-discharge bin spout for controlling the flow of material therefrom; an open-bottom hopper having a lower upright necked portion; releasible means for clamping the open mouth of a bag onto said portion and suspending and supporting the bag from said hopper in position therebeneath to receive material flowing thereinto; scale means supporting said hopper against horizontal but for limited vertical movement beneath the spout in position to receive material flowing therefrom; means operatively associated with said scale means for partially closing said valve as the material loaded into the bag approaches a predetermined weight; and additional means operatively associated with said scale means for substantially simultaneously completely closing said valve and releasing said clamping means to allow the bag to drop from said hopper when the loaded material reaches said predetermined weight, said valve closing and partially closing means including a first power cylinder and piston rod unit having one end thereof fixed to said valve for pivoting the latter by rocking movements of said unit, and a second power cylinder and piston rod unit having one end thereof pivotally connected to the other end of said first unit and the other end thereof pivotally connected to a fixed element.

2. An automatic weighing and loading machine comprising: a valve adapted to be attached to the open end of a gravity-discharge bin spout for controlling the flow of material therefrom; first fluid pressure motor means for operating said valve; an open-bottom hopper having a lower upright necked portion; releasible means for clamping the mouth of a bag onto said portion and suspending and supporting the bag from said hopper in position therebeneath to receive material discharged thereinto; second fluid pressure motor means for operating said clamping means; scale means supporting said hopper against horizontal but for limited vertical movement beneath said valve in position to receive material discharged therethrough; solenoid valve means for controlling said first and second motor means; and means responsive to a predetermined weight of material in a bag suspended from said hopper for automatically operating said solenoid valve means to cause said first and second motor means to substantially simultaneously close said valve and release said clamping means to allow the suspended bag to drop from said hopper, said weight-responsive means including electrical controlling circuits for said solenoid valve means and a switch operated by said scale means and connected into said circuits.

3. The structure defined in claim 2 including a manually actuable second switch connected into the circuits for operating the solenoid valve means to cause the first and second motor means to simultaneously open the valve and reset the clamping means to suspend a bag from the hopper.

4. The structure defined in claim 2 including means responsive to a material weight in the bag approaching the said predetermined weight for automatically operating the solenoid valve means to cause the first motor means to move the valve to a partially closed position, said responsive means including a second switch operated by the scale means and connected into the circuits for the solenoid valve means.

5. The structure defined in claim 4 in which the first motor means includes two fluid pressure motors, one serving to move the valve between fully open and said partially closed position, and the other serving to move said valve between the latter position and fully closed position.

References Cited in the file of this patent

UNITED STATES PATENTS

| | | |
|---|---|---|
| 619,834 | Nickerson | Feb. 21, 1899 |
| 984,537 | Buschman | Feb. 21, 1911 |
| 1,777,227 | Roth | Sept. 30, 1930 |
| 2,027,261 | Wright | Jan. 7, 1936 |
| 2,040,660 | Lenhart | May 12, 1936 |
| 2,055,730 | Rees | Sept. 29, 1936 |
| 2,086,416 | Howard | July 16, 1937 |
| 2,232,437 | Bushman | Feb. 18, 1941 |
| 2,293,518 | Moyle | Aug. 18, 1942 |
| 2,319,193 | Walter | May 11, 1943 |
| 2,345,287 | Peterson | Mar. 28, 1944 |
| 2,350,529 | Peterson | June 6, 1944 |
| 2,352,114 | Muskat | June 20, 1944 |
| 2,402,217 | Vredenburg | June 18, 1946 |
| 2,408,225 | Peterson | Sept. 24, 1946 |
| 1,795,265 | Rice | Mar. 3, 1931 |
| 2,546,193 | Lindstaedt | Mar. 27, 1951 |
| 2,549,704 | Noble | Apr. 17, 1951 |
| 2,564,544 | Richardson | Aug. 14, 1951 |
| 2,603,443 | Miller | July 15, 1952 |
| 2,610,020 | Peterson | Sept. 9, 1952 |
| 2,613,053 | Dorrington et al. | Oct. 7, 1952 |
| 2,634,080 | Knobel | Apr. 7, 1953 |
| 2,634,085 | Allen et al. | Apr. 7, 1953 |